United States Patent

[11] 3,582,030

| [72] | Inventor | James H. Barrett, Jr.<br>3863 Surrey Road, Toledo, Ohio 43615 |
|---|---|---|
| [21] | Appl. No. | 838,853 |
| [22] | Filed | July 3, 1969 |
| [45] | Patented | June 1, 1971 |

[54] PLASTIC RETAINER FOR BATTERY CABLES
11 Claims, 8 Drawing Figs.

[52] U.S. Cl. .................................................. 248/74,
24/73, 24/81
[51] Int. Cl. .................................................. F16l 3/00
[50] Field of Search ........................................ 248/74, 73,
72; 136/181, 181.2, 181.1, 134, 182.5; 24/81 CC,
81.3, 81.35, 73.7

[56] References Cited
UNITED STATES PATENTS

| 499,549 | 6/1893 | Hunter | 248/72 |
|---|---|---|---|
| 1,090,190 | 3/1914 | Bell | 248/72X |
| 1,399,960 | 12/1921 | Harding | 248/72 |
| 1,968,596 | 7/1934 | Benander | 248/74 |
| 2,537,719 | 1/1951 | Tuepker | 248/72X |
| 2,682,124 | 6/1954 | Purdy | 136/181X |
| 2,786,881 | 3/1957 | Lewis | 136/177 |
| 2,910,208 | 10/1959 | Doyle | 248/359X |
| 3,228,640 | 1/1966 | Wolsh | 248/72 |
| 3,286,963 | 11/1966 | Bergman | 248/74 |

FOREIGN PATENTS

| 1,092,531 | 4/1955 | France | 248/73 |
|---|---|---|---|
| 592,755 | 9/1947 | Great Britain | 248/74 |

*Primary Examiner*—Chancellor E. Harris
*Attorney*—Hugh Adam Kirk

ABSTRACT: A plastic battery cable support holder or retainer having flexible or resilient portions and including a base portion provided with facing L-shaped fingers extending in one direction therefrom adapted to snap over and snugly engage an intercell connector of an industrial battery. An apertured body portion, extending from the base portion in another direction, supports a battery cable in a spaced relation to the top surface of the industrial battery.

INVENTOR.
JAMES H. BARRETT, JR.
ATTORNEY

PLASTIC RETAINER FOR BATTERY CABLES

BACKGROUND OF THE INVENTION

This invention relates to support holders for cables and specifically to cable support holders designed especially for use in connection with industrial batteries.

Generally in the installation of industrial batteries having many cells which are interconnected by flat elongated bus bars, or cell interconnectors, the cables connecting these batteries to an electrically operated device must lay across these bus bars and the soft sealing compound around the top edges of the cells because of the normal spaced positions of the output terminals of the batteries. Thus, these cables are subject to erosion and wear of both themselves and the battery to which they are attached by their free movement over the tops of the battery and its cell interconnectors and filling caps, as well as by embedding themselves into the soft sealing compound causing leakage of the chemicals in the cells.

SUMMARY OF THE INVENTION

Generally speaking, the cable support holder or retainer of this invention has a flexible rectangular, substantially flat or planar base portion, opposed ends of which are affixed with facing L-shaped fingers which form resilient jaws which extend in one direction therefrom. These L-shaped fingers include vertical leg portions and substantially horizontal flanges. These flanges may be of equal length or of different lengths for snapping over a battery cell interconnector spaced from the top surface of the battery cell covers. Furthermore, these flanges may converge inwardly toward the base portion so that the inner surface of the flat base portion snugly engages the top surface of the cell interconnector. Also one of the flanges may have a thickness equal to the space between the under face of the interconnector and the top or cover of the battery to add support to the holder relative to the interconnector, especially when the cable held thereby is cantilevered to that side of the interconnector.

An apertured body portion may project from the outside surface of the base at any position therealong or it may extend or be cantilevered from the outside surface of one of the legs of the L-shaped finger. This body portion should not cover the full outside surface of the base portion so as to permit some flexibility of the base portion to ease the snapping of the jaws or legs over the cell interconnectors. The axis of the aperture in this body portion may be parallel to the channel between the L-shaped fingers or it may be transverse thereof. Furthermore, this aperture may be circular for receiving a cable or elongated for receiving a pair or plurality of cables.

Since this body portion together with the base portion and legs or jaws are preferably molded or extruded from an integral piece of the resilient plastic material, the body over the aperture may be slit so that the cable may be released, replaced, and the retainer reused without unsnapping the jaws from the cell interconnectors.

OBJECTS AND ADVANTAGES

An object of this invention is to provide a one piece plastic battery cable retainer or holder for attachment to a battery cell interconnector that is easily and economically made of molded plastic having high strength and that is dimensionally stable under wide variations of temperature.

Another object of the invention is to provide a holder that can be securely mounted in place without special clamp means or tools for its installation, and which can be readily removed, replaced, or slit to have its cable removed and replaced.

BRIEF DESCRIPTION OF THE DRAWINGS

The above mentioned and other features, objects and advantages and a manner of attaining them are described more specifically below by reference to embodiments of this invention shown in the accompanying drawings, wherein.

DETAILED DESCRIPTION OF THE PREFERRED EMBODIMENTS

Figure 1:
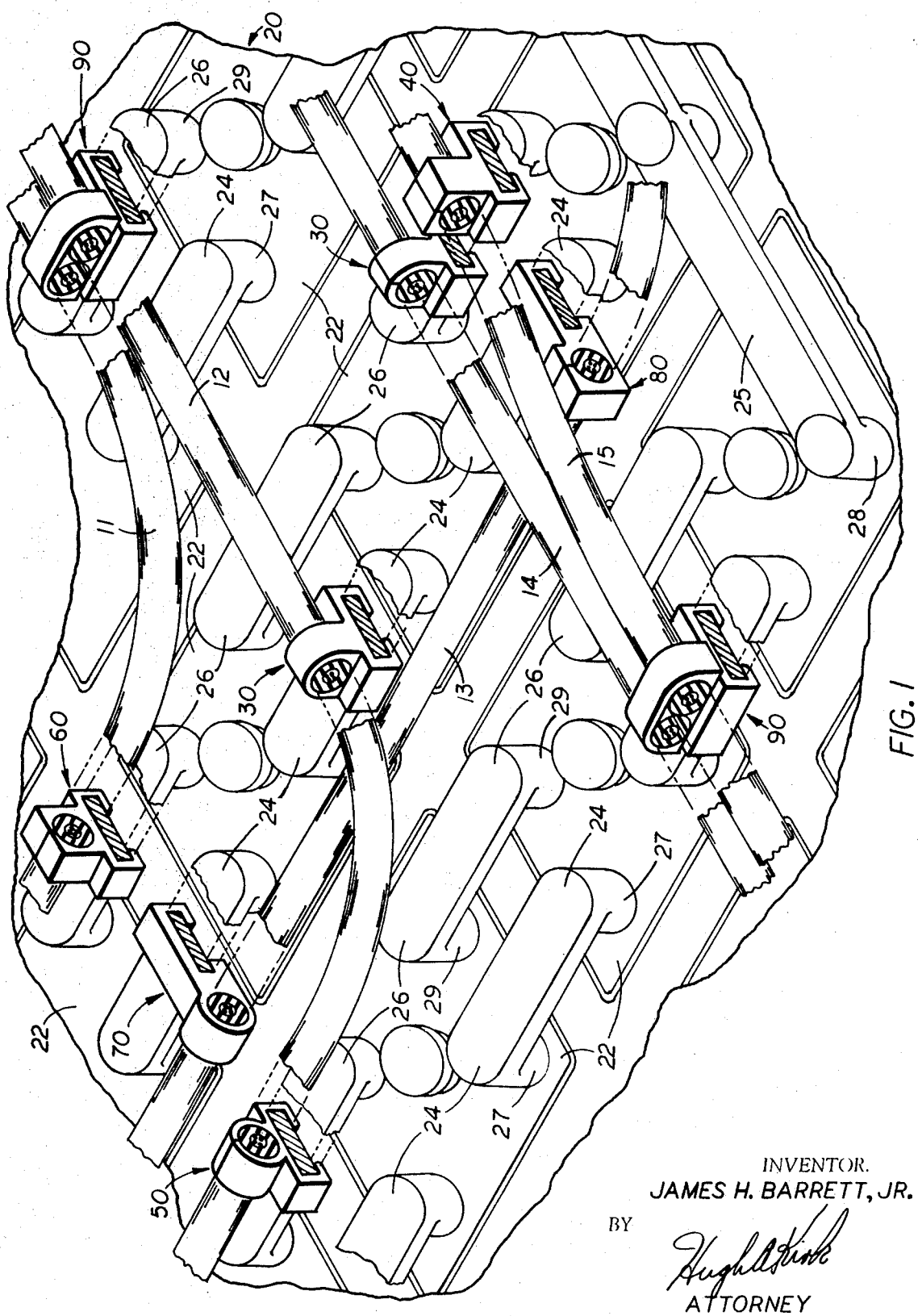
FIG. 1 is a composite perspective view of part of the top of an industrial battery showing various battery cable arrangements mounted both parallel and transverse to the cell interconnectors by means of the molded plastic cable retainers that are the subject of this invention.

Referring now to FIG. 1 of the drawings, there is shown a composite view of various cables 11, 12, 13, 14 and 15 used to connect the output terminals (not shown) of an industrial type battery 20 to an electrically operated device (not shown) and which are supported by various cable retainers constructed in accordance with this invention.

This industrial battery 20 generally comprises a plurality of cells 22 connected together by pairs of cell interconnectors or bus bars 24, 25 and 26 spaced above the top surface of the battery cells by posts 27, 28, and 29, respectively, at their ends, and on which interconnectors the cables 11 through 15 are supported, transverse thereof and parallel thereto, by means of holders or retainers 30, 40 90 and 50, 60 70, 80, respectively.

The cable holders or retainers 30, 40, 50, 60, 70, 80, and 90 are formed from a suitable plastic material which has desired characteristics of resiliency, elasticity, flexibility, strength, and dimensional stability over wide temperature ranges such as for example: rubber, polyethylene, polypropylene, polyallomer, etc. resins. These retainers may be molded as integral units and require no assembly or finishing operations.

The retainers 30, 40, 50, 60, 70, 80, and 90, illustrated in FIGS. 2 through 8 respectively, have flexible rectangular base portions 31, 41, 51, 61, 71, 81, and 91, the opposed ends of which are provided with facing L-shaped fingers 32, 34; 42, 44; 52, 54; 62, 64; 72, 74; 82, 84; and 92, 94; respectively, extending in one direction therefrom and act as resilient jaws. Each of the pairs of L-shaped fingers, or each of the jaws, are provided with transverse inwardly facing flanges 33, 35; 43, 45; 53, 55; 63, 65; 73, 75; 83, 85; and 93, 95 which define a C-shaped channel or open area 36, 46, 56, 66, 76, 86, and 96, respectively. These C-shaped channels are substantially equal in width and height to the cross-sectional area of the cell interconnectors 24, 25 and 26 so as to receive, snugly engage and securely seat the base portions 31, 41, 51, 61, 71, 81, and 91 thereon. As shown in FIG. 1 the under surface of these base portions abut the top surface of the cell interconnectors 24, 25 and 26.

Extending in another direction from each base portion 31, 41, 51, 61, 71, 81, and 91 is a body portion 37, 47, 57, 67, 77, 87, and 97 having an aperture 38, 48, 58, 68, 78, 88, and 98, respectively, for receiving any one of the cables 11 through 15. The size of these apertures is substantially equivalent to the cross-sectional area of the cable to be supported so that the cable will be firmly supported thereby except for the aperture 98 in the body 97 which is doubled in size to hold two cables in a side-by-side relationship (see also FIG. 1).

Figure 2:
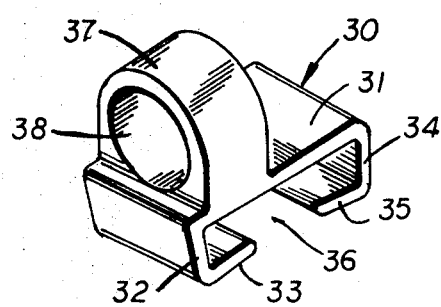
FIGS. 2 and 3 are enlarged perspective views of one form of molded plastic cable retainers, adapted to support a battery cable transverse to the cell interconnector and having inwardly converging flanges of equal length.
Figure 3:
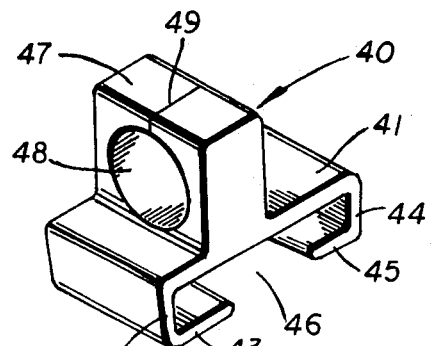
Figure 8:
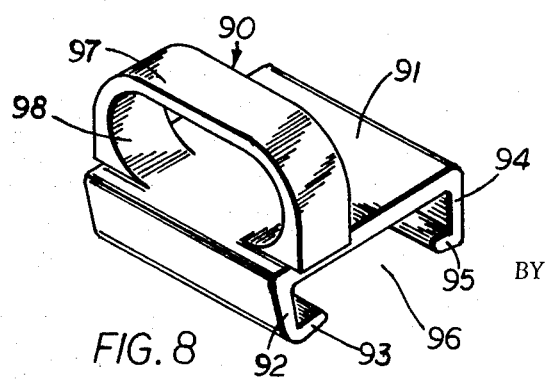
FIG. 8 is a perspective view of another form of molded plastic cable retainer having an apertured body portion adapted to support a plurality of battery cables transverse to the top of the cell interconnector.

In the cable retainers 30, 40 and 90 shown in FIGS. 2, 3 and 8, respectively, the apertured body portions 37, 47, and 97 are offset from the longitudinal centerline of the C-shaped channel area and thus they do not materially stiffen the flexible base portions 31, 41 and 91. Since the base portions of these retainers 30, 40 and 90 are quite flexible, the flanges 33, 35; 43, 45; and 93, 95, respectively, may be of equal length and converge inwardly toward their base portions 31, 41 and 91 in order to facilitate the installation and clamping of the jaws on the cell interconnectors 24 and 26.

Figure 4:
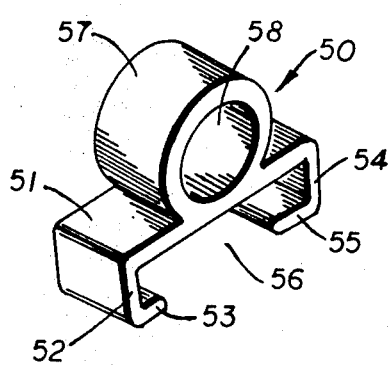
FIGS. 4 and 5 are enlarged perspective views of another form of molded plastic cable retainers, adapted to support a battery cable parallel to and on top of the cell interconnector and having inwardly converging flanges of different lengths.
Figure 5:
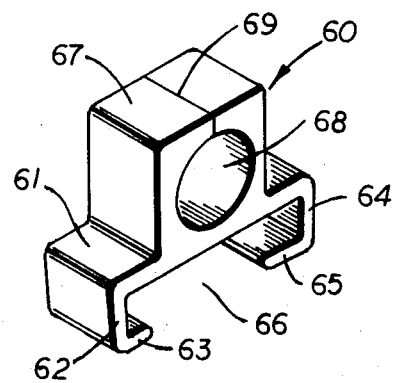

The body portions 57 and 67 of the retainers 50 and 60, respectively, shown in FIGS. 4 and 5, are disposed on the longitudinal centerline of the C-shaped channel area, and thus tend to stiffen their respective base portions 51 and 61. In this case the length of the flanges 53 and 63 are shorter than the length of the flanges 55 and 65 so that they may be more easily snapped on the cell interconnectors 24 or 26. These flanges 53, 55 and 63, 65 also may converge inwardly toward the longitudinal centerline of the C-shaped channel.

Figure 6:
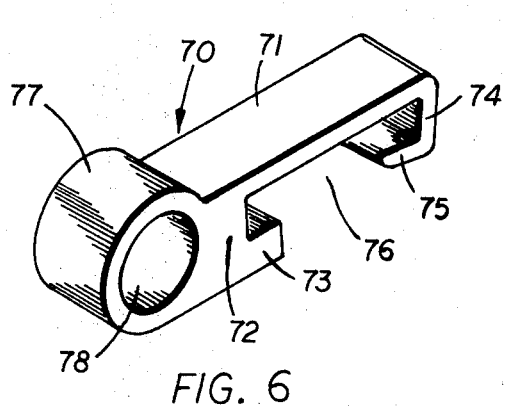
FIGS. 6 and 7 are enlarged perspective views of another form of molded plastic cable retainer, adapted to support a battery cable parallel to and along side of the cell interconnector and having jaws, one of which has a thick flat inwardly converging flange and the other of which has a thinner flat inwardly converging flange.
Figure 7:
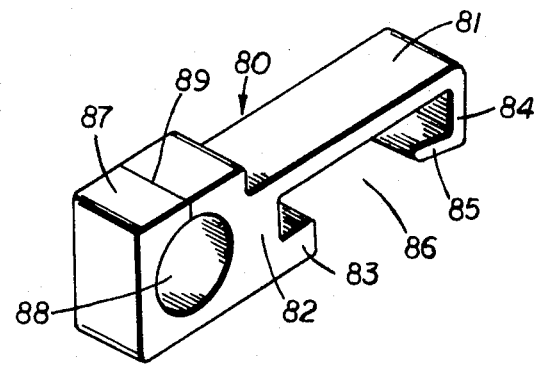

Referring now to FIGS. 6 and 7, the apertured body portions 77 and 87 extend from an end of the base portions 71 and 81 or are cantilevered, adjacent the L-shaped fingers 72 and 82, respectively, In these embodiments, the height of the flanges 73 and 83 are substantially equal to the distance or space between the under surface of the interconnector 24 or 26 and the top or covers of the cells 22 so as to be firmly wedged therebetween and prevent bending of the body portions of the retainers 70 or 80. The other flanges 75 and 85 of these retainers 70 or 80. The other flanges 75 and 85 of these retainers 70 and 80, respectively, converge inwardly toward the longitudinal centerline, so as to snap around the interconnectors 24 or 26.

All the apertured bodies of these holders may be slit as shown at 49, 69, and 89 in FIG. 3, 5 and 8, respectively, before or after installation to facilitate the threading of a cable therethrough and/or removal and replacement of a cable after their installation.

It should be understood that the different length and thickness of the flanges of the jaws, as well as the different outside shape of the body portions can be interchanged among the different embodiments without departing from the scope of this invention.

I claim:

1. An integral resilient retainer for supporting a battery cable adjacent a battery cell interconnector, said retainer comprising:
    a. a substantially planar rectangular flexible base portion having an abutting surface for abutting a surface of a cell interconnector;
    b. an L-shaped flexible clamping finger extending in one direction from each end of said base portion, each said L-shaped finger having
        1. a leg extending at a right angle to said base portion, and
        2. a flange extending from the outer end of each said leg toward the other said leg and converging inwardly toward said base portion, said fingers forming an open channel therebetween for receiving the cell interconnector; and
    c. an apertured body portion extending in another direction from said base portion for receiving and supporting a battery cable, said body portion being between the sides of and spaced from at least one end of said base portion whereby said base portion has at least one flexible area.

2. A retainer according to claim 1 wherein the axis of said apertured body portion is parallel to said channel between said L-shaped fingers.

3. A retainer according to claim 1 wherein the axis of said apertured body portion is transverse to said channel between said L-shaped fingers.

4. A retainer according to claim 1 wherein said aperture of said body portion is circular.

5. A retainer according to claim 1 wherein said aperture of said body portion has an elongated cross section.

6. A retainer according to claim 1 wherein said apertured body portion is offset from and is adjacent one end of said planar base portion.

7. A retainer according to claim 1 wherein said apertured body portion extends from one of said L-shaped fingers.

8. A retainer according to claim 1 wherein said flanges of said L-shaped fingers are of different lengths.

9. A retainer according to claim 1 wherein one of said flanges is of a thickness equal to the distance between the top cover of a battery cell and the underside of the cell interconnector.

10. A retainer according to claim 1 composed of plastic material.

11. A retainer according to claim 1 wherein said apertured body portion contains a slit parallel to its aperture.